United States Patent [19]

Rhodes

[11] Patent Number: 5,358,683
[45] Date of Patent: Oct. 25, 1994

[54] PROCESS OF MAKING A CONTINUOUS FIBER REINFORCED THERMOPLASTIC ARTICLE

[75] Inventor: Richard Rhodes, Somersworth, N.H.
[73] Assignee: Davidson Textron Inc., Dover, N.H.
[21] Appl. No.: 44,935
[22] Filed: Apr. 8, 1993
[51] Int. Cl.⁵ .................. B29C 49/04; B29C 49/20
[52] U.S. Cl. .................. 264/515; 264/516; 425/503
[58] Field of Search ............ 264/512, 515, 516, 540; 425/503, 522, 523

[56] References Cited

U.S. PATENT DOCUMENTS

| | | | |
|---|---|---|---|
| 1,933,019 | 10/1933 | Laubi | 264/516 |
| 2,974,362 | 3/1961 | Knowles | 18/5 |
| 3,023,461 | 3/1962 | Sherman | 18/55 |
| 3,215,406 | 11/1965 | Perry et al. | 259/4 |
| 3,234,309 | 2/1966 | Graff | 264/516 |
| 3,387,324 | 4/1966 | Valyi | 18/5 |
| 3,900,545 | 8/1975 | Korejwa et al. | 264/511 |
| 4,122,142 | 10/1978 | Lawrence et al. | 264/512 |
| 4,731,216 | 3/1988 | Topolski | 264/503 |
| 4,838,778 | 6/1989 | Becker et al. | 425/133 |
| 5,080,850 | 1/1992 | Holloway | 264/515 |
| 5,085,821 | 2/1992 | Nohara | 264/515 |
| 5,088,571 | 2/1992 | Burry et al. | 180/90 |
| 5,089,209 | 2/1992 | Bailey et al. | 264/540 |
| 5,194,212 | 3/1993 | Bonnett | 264/515 |

OTHER PUBLICATIONS

Pultrusion and Pulforming by G. W. Ewald published in Modern Plastics Encyclopedia 1984-1985 on pp. 324-325.

*Primary Examiner*—Catherine Timm
*Attorney, Agent, or Firm*—Reising, Ethington, Barnard, Perry & Milton

[57] ABSTRACT

A process for making a continuous fiber reinforced thermoplastic article that is sufficiently strong and rigid for use as a structural member includes the steps of providing a tubular composite parison that has continuous, axially oriented glass fiber filaments dispersed in a thermoplastic resin and admitting pressurized air into the interior of the tubular parison to expand the tubular parison to a desired shape.

8 Claims, 1 Drawing Sheet

PROCESS OF MAKING A CONTINUOUS FIBER REINFORCED THERMOPLASTIC ARTICLE

BACKGROUND OF THE INVENTION

This invention relates to a process for making a thermoplastic article and more particularly to a process for making a fiber reinforced thermoplastic article that can be used as a structural member, such as a cross car beam or a structural instrument panel carrier.

U.S. Pat. No. 5,088,571 issued to Donald L. Burry and Leonard J. Pilato Feb. 18, 1992 discloses a modular instrument panel carrier that comprises a box shaped beam that extends transversely across the vehicle. The box shaped beam is made from two panels of fiber reinforced plastic that have flanged edges that are bonded together. The patent specification does not describe the manufacturing process for the panels or give any particulars for the reinforcement fibers or the plastic.

It is known that continuous fiber reinforced thermosetting plastic articles can be made by pultrusion. Pultrusion is a primary fabrication process for making continuous-length filament reinforced plastic composite profiles. In the common form, reinforcing filaments, such as glass fiber roving, saturated with catalyzed thermoset resin, are continuously pulled through a shaped orifice in a heated steel die. As the two materials, filaments and resin, pass through the die, polymerization of the resin occurs to continuously form a rigid cured profile corresponding to the die orifice shape. Resin materials include rigid and flexible polyesters and combinations thereof, vinyl esters, one-part epoxies that cure like polyesters, and high performance resins based on urethane reaction with vinyl esters and unsaturated polyesters. Reinforcing materials include glass fiber rovings, graphite fibers and nonwoven veils. While this process is capable of making structural members, the articles produced by this process are necessarily limited to straight, constant shaped products or profiles that can be configured by an orifice in a heated steel die or the like because the thermosetting plastic material is hardened permanently after it leaves the heated die.

It is also known from U.S. Pat. No. 3,023,461 granted to Orville B Sherman Mar. 6, 1962 and from U.S. Pat. No. 5,085,821 granted to Shigero Nohara Feb. 4, 1992 that small, hollow, non-structural thermoplastic articles of changing shape, such as double layered bottles, can be made by combining extrusion and blow molding processes. The thermoplastic articles produced by this combined process are not limited to straight, constant shape products or profiles that can be configured by an orifice of an extruder. Indeed, the combined process is capable of producing small, hollow products that are straight or curved and having either constant area and changing shape or changing area and changing shape. However, the physical properties, particularly the strength and structural rigidity, of these hollow thermoplastic articles are limited by the wall thickness and/or hollow shapes that can be generated by the combined process because no reinforcement is used.

On the other hand, it is further known from U.S. Pat. No. 4,731,216 granted to Alvin S. Topolski Mar. 15, 1988 that small, hollow, non-structural thermoplastic articles, such as bottles, can be made by a combined extrusion and blow molding process from a reinforced mixture comprising a thermoplastic matrix having particles of an incompatible thermoplastic material for reinforcement. However, the physical properties, particularly the strength and structural rigidity, of the hollow, reinforced thermoplastic article are limited to those that can be obtained from a mixture that is discontinuous by nature.

SUMMARY OF THE INVENTION

The object of this invention is to provide a process for making a hollow reinforced thermoplastic article of any size or shape that is strong enough to be used as a structural member, such as a cross car beam or a structural instrument panel carrier.

A feature of the process of the invention is that a thermoplastic tubular parison reinforced with continuous fibers extending longitudinally from end to end is blow molded to provide a hollow structural member of desired shape.

Another feature of the process of the invention is that the process can produce a hollow structural member of continuous fiber reinforced thermoplastic material of straight or curved shape.

Another feature of the process of the invention is that the process can produce a hollow structural member of continuous fiber reinforced thermoplastic material of constant area and changing shape or of changing area and changing shape.

Still another feature of the process of the invention is that the process can produce a hollow, fiber reinforced thermoplastic structural member of one piece construction that is large enough and strong enough to serve as an instrument panel carrier and/or a cross car beam.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
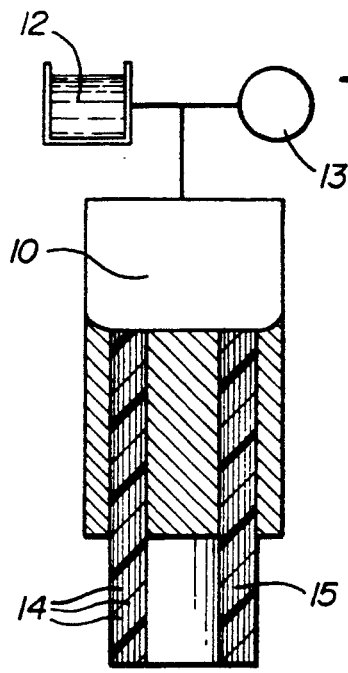
FIG. 1 is a section view of an apparatus for practicing part of a process in accordance with the invention.

Referring now to the drawing, an elliptical or round die 10 is connected to a source of material including a polymer melt such as molten polycarbonate, ABS or a blend of these 12 and continuous glass fibers 13 in reel form. The material is combined and fed through the die 10 in any suitable manner so that the combined material exits the die orifice as a continuous composite extrudate 15 of tubular shape that includes the continuous glass fibers 14 oriented longitudinally or axially in the composite extrudate 15. The material may be fed through the die 10 pushing the material through in a pure extrusion, pulling the material through in a pure pultrusion process or using a combination of pushing and pulling.

Moreover, the die 10 may be oriented vertically as shown in FIG. 1 to take advantage of the force of gravity in feeding the material through the die 10.

Figure 2:
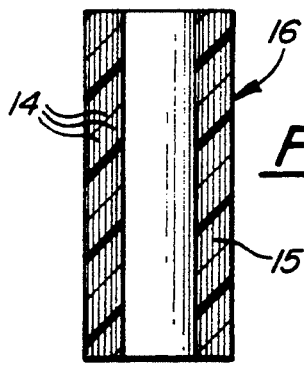
FIG. 2 is a section view of a parison made in accordance with the invention using the apparatus of FIG. 1.

In any event, the composite extrudate 15 is cut off in a predetermined length to form a tubular parison 16 of reinforced thermoplastic material that includes the embedded continuous glass fibers 14 that are oriented longitudinally and extend from end-to-end in the parison 16 as shown in FIG. 2. The heated die 10 and the tubular parison 16 which are shown in FIGS. 1 and 2 are round or circular. However, it is to be understood that other shapes are possible and that this initial shape has been chosen simply for purposes of illustration. On the other hand it should be pointed out, that the shape of the parison, be it round, elliptical, rectangular, hexagonal or whatever, should be selected with the shape of the final product in mind.

The tubular parison 16 is then centrally located in a larger cavity of a two piece blow mold 18 by bringing the mold halves together in the lateral direction to enclose the tubular parison 16.

Figure 3:
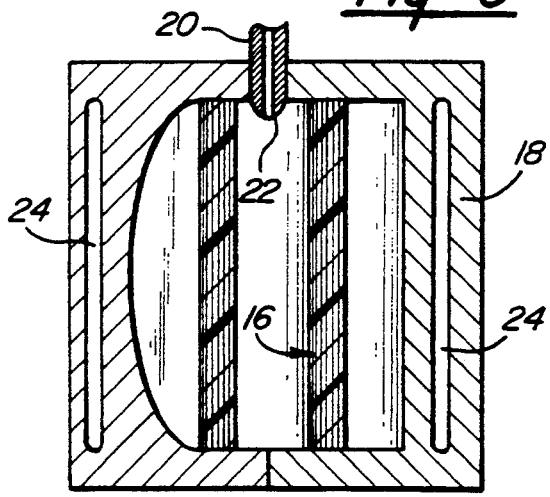
FIG. 3 is a section view of another apparatus for practicing another part of the process in accordance invention.

A blow tube 20 is then inserted through an aperture in the top of the closed mold into the interior of the tubular parison 16 as shown in FIG. 3. The blow tube 20 is connected to a source of pressurized fluid blowing medium (not shown), such as air and preferably cool air.

The pressurized fluid blowing medium is then admitted into the interior of the tubular parison 16 via the blow tube 20. The pressurized fluid medium expands the tubular parison 16 outwardly against the peripherical wall of the blow mold 18 as indicated by the open arrows in FIG. 4. This forms the continuous fiber reinforced thermoplastic article 26 which is removed from the blow mold 18 when it is cool enough. The thermoplastic article 26 which is representative of a box-shaped instrument panel carrier or cross car beam has continuous reinforcement fibers that extend longitudinally substantially from one end to the other as indicated in FIG. 5.

The blow mold 18 has means for adjusting the temperature of the thermoplastic article 26 if the fluid blowing medium does not cool the thermoplastic article 26 enough. This temperature adjusting means comprises a fluid jacket or tubes 24 in the peripheral wall of the blow mold 18 that is part of a recirculating fluid system (not shown). This system circulates cold fluid, such as air or water, through the fluid jackets 24 for cooling the thermoplastic article 26 to the proper temperature for removing it from the blow mold 18. The temperature adjusting means including the fluid jackets 24 may also be used to heat the tubular parison 26 up to the proper blow molding temperature in the event that heating is required at this earlier stage of the process. This may be accomplished by circulating warm or hot fluid.

The blow depth/ratio, that is the maximum perimeter of the thermoplastic article 26 in comparison to the perimeter of the tubular parison 16 depends on the fiber content and would decrease with higher amounts of fiber content.

Figure 5:
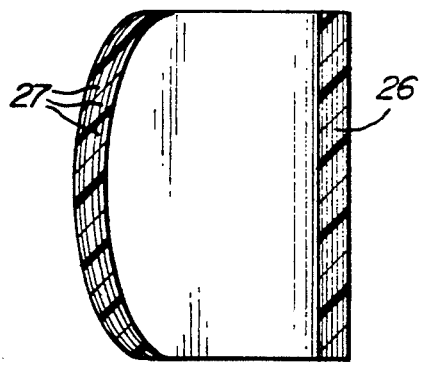
FIG. 5 is a section view of a structural member made in accordance with the process of the invention using the apparatus of FIGS. 1, 3, and 4.
Figure 6:
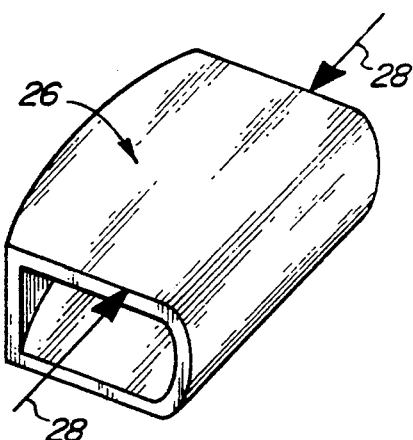
FIG. 6 is a perspective view of the structural member that is shown in FIG. 5.

The continuous fiber reinforced thermoplastic article 26 is generally rectangular but bowed outwardly in the longitudinal direction on one side and in the transverse direction on the other side as shown in section in FIG. 5 and in perspective in FIG. 6. This shape was chosen for purposes of illustration to demonstrate that the article produced by the process of this invention can be curved and have a changing area and a changing shape as well. Consequently it should be understood that other shapes are also possible including simple straight shapes of constant profile.

In any event the thermoplastic article 26 has continuous fiber reinforcement extending longitudinally substantially from end to end. This greatly enhances the strength and structural rigidity of the thermoplastic article in the longitudinal direction indicated by the arrows 28 in FIG. 6. It also greatly adds to flexural modulus in the transverse direction and hence the ability of the article to flex is enhanced. Consequently the thermoplastic article 28 is extremely well suited for use as a cross car beam or a structural instrument panel carrier.

The process of the invention has been described with an example where the thermoplastic material is polycarbonate, ABS or a blend of these and the reinforcement is continuous glass fiber filaments. Other materials are also possible. For instance, the thermoplastic material that may be used includes polycarbonate (PC), acrylonitrile butadiene styrene (ABS) polyvinyl chloride (PVC), polyphenylene oxide (PPO), polypropylene (PP), and polyethylene (PE), in addition to blends of any of these or similar polymers. The reinforcement materials that may be used also includes other continuous filaments such as graphite, KEVLAR aramid, and polyester, in addition to the glass fiber.

Figure 4:
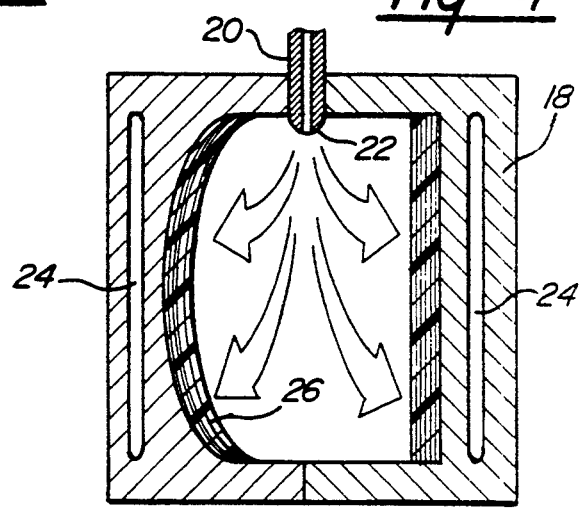
FIG. 4 is the section view of the apparatus of FIG. 3 at a later stage of that part of the process that can be practiced with the apparatus of FIG. 3.

The initial part of the process described in connection with FIG. 1 is essentially a pultrusion or extrusion process or a combination of both. Such a process by nature is a continuous process. The later part of the process described in connection with FIGS. 3 and 4 is essentially a blow molding process which commonly is an intermittent process. This can be accommodated by having the pultrusion and/or extrusion type apparatus (represented by FIG. 1) operate intermittently with one set of blow molds (represented by FIGS. 3 and 4) or by having the pultrusion and/or extrusion type apparatus operate continuously for a number of sets of blow molds that are fed by the pultrusion or extrusion type apparatus sequentially.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A process for making a continuous fiber reinforced thermoplastic article that is sufficiently strong and rigid for use as a structural member, comprising the steps of:

provinding an open tubular parison of predetermined length from a tubular composite of reinforced thermoplastic material that consists essentially of continuous, axially oriented filaments embedded in a thermoplastic resin, said filaments extending substantially from one parison end to the other parison end, enclosing the open tubular parison in a cavity of a blow mold, and admitting a pressurized fluid blowing medium into the interior of the tubular parison to expand the tubular parison outwardly against the blow mold to form a continuous fiber reinforced thermoplastic article.

2. A process for making a fiber reinforced thermoplastic article that is sufficiently strong and rigid for use as a structural member, comprising the steps of:

extruding and/or pultruding a tubular composite of reinforced thermoplastic material that consists essentially of continuous, axially oriented filaments embedded in a thermoplastic resin, providing a tubular parison of predetermined length from the tubular composite having said filaments extending substantially from one parison end to the other parison end, enclosing the tubular parison in a cavity of a blow mold, and admitting a pressurized fluid blowing medium into the interior of the tubular parison to expand the tubular parison outwardly against the blow mold to form a continuous fiber reinforced thermoplastic article.

3. A process for making a continuous fiber reinforced thermoplastic article of irregular shape that is sufficiently strong and rigid for use as a structural member, comprising the steps of:

providing a tubular parison of predetermined length from a tubular composite that consists essentially of continuous, axially oriented filaments selected from the group consisting of glass, graphite, KEVLAR, and polyester embedded in a thermoplastic resin selected from the group consisting of polycarbonate (PC), acrylonitrile butadiene styrene (ABS), polyvinylchloride (PVC), polyphenylene oxide (PPO), polypropylene (PP), polyethylene (PE) and blends thereof, said filaments extending substantially from one parison end to the other parison end, enclosing the tubular parison in a cavity of a blow mold, admitting a pressurized fluid blowing medium into the interior of the tubular parison to expand the tubular parison outwardly against the blow mold to form an irregularly shaped continuous fiber reinforced thermoplastic article.

4. A process for making a fiber reinforced thermoplastic article of irregular shape that is sufficiently strong and rigid for use as a structural member, comprising the steps of:

providing a tubular parison of predetermined length from a tubular composite that consists essentially of continuous, axially oriented glass filaments embedded in a thermoplastic resin comprising polyvinyl chloride, said filaments extending substantially from one parison end to the other parison end, enclosing the tubular parison in a cavity of a blow mold and admitting a pressurized fluid blowing medium into the interior of the tubular parison to expand the tubular parison outwardly against the blow mold to form an irregularly shaped continuous fiber reinforced plastic article.

5. The process as defined in claim 1 wherein the tubular composite of reinforced thermoplastic material that consists essentially of continuous, axially oriented filaments embedded in a thermoplastic resin is provided by combining and feeding a polymer melt and continuous fibers through a die in an extrusion, pultrusion or combined extrusion/pultrusion process.

6. The process as defined in claim 5 wherein the die is oriented vertically and the polymer melt and continuous fibers are combined and fed into a top of the die to take advantage of gravity.

7. The process as defined in claim 5 wherein the extrusion, pultrusion or combined extrusion/pultrusion process is continuous so as to provide a series of open tubular parisons of predetermined length and practiced in conjunction with a plurality of blow molds so that the series of open tubular parisons are enclosed in respective cavities of the plurality of blow molds in a sequential fashion.

8. The process as defined in claim 5 wherein the extrusion, pultrusion or combined extrusion/pultrusion process is intermittent and practiced in conjunction with a single blow mold.

* * * * *